(12) United States Patent
Zhou et al.

(10) Patent No.: US 11,555,341 B2
(45) Date of Patent: Jan. 17, 2023

(54) BIAXIAL HINGE MECHANISM USED ON MOBILE TERMINAL AND MOBILE TERMINAL

(71) Applicant: Hangzhou Amphenol Phoenix Telecom Parts Co., Ltd., Zhejiang (CN)

(72) Inventors: YuanYue Zhou, Zhejiang (CN); Jingci Fei, Zhejiang (CN); Mengyu Si, Zhejiang (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 651 days.

(21) Appl. No.: 16/608,426

(22) PCT Filed: Sep. 26, 2017

(86) PCT No.: PCT/CN2017/103322
§ 371 (c)(1),
(2) Date: Oct. 25, 2019

(87) PCT Pub. No.: WO2018/196275
PCT Pub. Date: Nov. 1, 2018

(65) Prior Publication Data
US 2020/0141167 A1    May 7, 2020

(30) Foreign Application Priority Data

Apr. 27, 2017    (CN) .......................... 201720458186.4

(51) Int. Cl.
*E05D 5/12*    (2006.01)
*E05D 5/14*    (2006.01)
(Continued)

(52) U.S. Cl.
CPC ............... *E05D 5/125* (2013.01); *E05D 5/14* (2013.01); *F16C 11/04* (2013.01); *G06F 1/1616* (2013.01); *G06F 1/1681* (2013.01); *Y10T 16/547* (2015.01)

(58) Field of Classification Search
CPC .......... E05D 5/125; E05D 5/14; E05D 3/122; F16C 11/04; G06F 1/1616; G06F 1/1681;
(Continued)

(56) References Cited

U.S. PATENT DOCUMENTS 8,966,715 B1 *   3/2015   Chen ...................... H04M 1/022
                                                    16/303
9,464,471 B1 *   10/2016  Chen ...................... G06F 1/1681
(Continued)

FOREIGN PATENT DOCUMENTS

CN         203548549 U  *  4/2014
CN         203796732 U     8/2014
(Continued)

*Primary Examiner* — William L Miller
(74) *Attorney, Agent, or Firm* — Muncy, Geissler, Olds & Lowe, P.C.

(57) ABSTRACT

Disclosed is a biaxial hinge mechanism used on a mobile terminal, comprising a first shaft and a second shaft parallel to each other, and a first support and a second support, wherein the first and second supports are respectively connected to the connection ends of the first and second shafts; the first and second supports are provided with connection end faces facing side faces of the connection ends; riveting columns formed in an integrated manner are provided on the connection end faces; connection through holes are provided on the connection ends; and the riveting columns are connected to the connection through holes. The spaces of the side faces of the hinge, rather than the spaces in the thickness direction of the hinge, are fully used to connect the supports, providing a high space utilization rate and aiding in greatly reducing the thickness of the hinge, and the used connection (Continued)

structure facilitates installation of the supports on the side faces of the hinge, providing a high connection strength. A relatively large rotating torque can be realized by the relatively small size, for example, the torque can reach over 3.5 kg·cm with the overall outer diameter within 3.3 mm.

10 Claims, 4 Drawing Sheets

(51) Int. Cl.
*F16C 11/04* (2006.01)
*G06F 1/16* (2006.01)

(58) Field of Classification Search
CPC ............ G06F 1/1618; H04M 1/022; E05Y 2900/606; Y10T 16/547; Y10T 16/541; Y10T 16/558
USPC ........ 16/366, 354, 387; 361/679.27, 679.06; 379/433.13; 455/575.3
See application file for complete search history.

(56) References Cited

U.S. PATENT DOCUMENTS

| | | | |
|---|---|---|---|
| 9,606,578 B2 * | 3/2017 | Yuan | G06F 1/1616 |
| 10,000,955 B2 * | 6/2018 | Shang | F16C 11/045 |
| 10,401,914 B2 * | 9/2019 | Shang | E05D 3/122 |
| 10,884,461 B2 * | 1/2021 | Lin | G06F 1/1616 |
| 2015/0159413 A1 * | 6/2015 | Chen | E05D 3/122 16/342 |
| 2015/0327383 A1 * | 11/2015 | Hsu | H04M 1/022 16/366 |
| 2015/0362958 A1 * | 12/2015 | Shang | G06F 1/1681 16/334 |
| 2016/0011632 A1 * | 1/2016 | Hsu | H04M 1/022 16/354 |
| 2017/0351303 A1 * | 12/2017 | Kuramochi | G06F 1/1681 |
| 2019/0155344 A1 * | 5/2019 | Lin | G06F 1/1681 |

FOREIGN PATENT DOCUMENTS

| | | | | |
|---|---|---|---|---|
| CN | 203796733 U | * | 8/2014 | |
| CN | 104613085 A | * | 5/2015 | |
| CN | 104613085 A | | 5/2015 | |
| CN | 104791369 A | | 7/2015 | |
| CN | 105179459 A | * | 12/2015 | ........... E05D 11/082 |
| CN | 205744871 U | * | 11/2016 | |
| CN | 205744872 U | * | 11/2016 | |
| CN | 205895885 U | * | 1/2017 | |
| CN | 205937447 U | | 2/2017 | |
| CN | 216382215 U | * | 4/2022 | |
| JP | 2015190584 A | | 11/2015 | |
| JP | 2016110588 A | | 6/2016 | |

* cited by examiner

BIAXIAL HINGE MECHANISM USED ON MOBILE TERMINAL AND MOBILE TERMINAL

TECHNICAL FIELD

The present invention relates to a mobile terminal and a biaxial hinge mechanism used on a mobile terminal.

BACKGROUND ART

At present, there are increasingly high requirement for the thickness of portable electronic products such as notebook computers. For a biaxial hinge, due to its complicated structure, it is more difficult to reduce the thickness under the premise of guaranteeing its original performance.

SUMMARY

An object of the present invention is to provide a biaxial hinge mechanism used on a mobile terminal, aiding in reducing the thickness of the mobile terminal. To this end, the invention employs the following technical solutions.

A biaxial hinge mechanism used on a mobile terminal, comprising a first shaft and a second shaft parallel to each other, and a first support and a second support, wherein the first and second supports are respectively connected to the connection ends of the first and second shafts, the first and second supports are provided with portions for connecting with two relatively rotating components on the mobile terminal; wherein:

The first support is provided with a connection end face facing side face of connection end of the first shaft, a first riveting column formed in an integrated manner with the first support is provided on the connection end face of the first support, the first shaft connection end is provided with a first connection through hole on the side face of the first shaft connection end; the first riveting column is connected to the first connection through hole; the second support is provided with a connection end face facing side face of connection end of the second shaft, a second riveting column formed in an integrated manner with the second support is provided on the connection end face of the second support, the second shaft connection end is provided with a second connection through hole on the side face of the second shaft connection end, the second riveting column is connected to the second connection through hole; the side face is the face the connection end faces of the first and second shafts face to when the biaxial hinge mechanism is in a closed state.

On the basis of the foregoing technical solutions, the present invention may employ the following further technical solutions or combine these technical solutions.

The connection end is provided with a groove around an opening of the other end of the connection through hole on another side face with respect to the side surface, and the groove is provided with a flat bottom surface.

The side face is a plane, and the connection end face is a plane.

The top surface and bottom surface of the connection end are planes when the biaxial hinge mechanism is in a closed state.

The side face is a plane, the connection end face is a plane; the top surface and bottom surface of the connection end are planes or concave surfaces when the biaxial hinge mechanism is in a closed state.

A synchronization mechanism is connected between the first shaft and the second shaft.

The synchronization mechanism comprises a first gear and a second gear respectively connected to the first shaft and the second shaft, rotation centers of the first gear and the second gear respectively coincide with rotation centers of the first shaft and the second shaft, the first gear is connected to the second gear by a transition gear pair composed of a third gear and a fourth gear, the number of teeth and diameter of the first gear are the same as the second gear, and the number of teeth and diameter of the third gear are the same as the fourth gear.

The first gear and the second gear are respectively sleeved outside the first shaft and the second shaft.

The biaxial hinge mechanism is further provided with a torsion member, and a first reed pipe and a second reed pipe are respectively provided on the upper and lower portions of the torsion member, the first reed pipe and the second reed pipe are respectively sleeved on the first shaft and the second shaft, and frictionally engaged with the first shaft and the second shaft respectively.

Another object of the present invention is to provide a portable electronic product using the foregoing biaxial hinge mechanism. To this end, the invention adopts the following technical solutions:

A mobile terminal, comprising a body and a cover, wherein the mobile terminal is provided with any one of the foregoing biaxial hinge mechanisms, and the first support and the second support are respectively connected to the body and the cover of the mobile terminal.

According to the above technical solutions of the present invention, the spaces of the side faces of the hinge, rather than the spaces in the thickness direction of the hinge, are fully used to connect the supports, providing a high space utilization rate and aiding in greatly reducing the thickness of the hinge, and the used connection structure facilitates installation of the supports on the side faces of the hinge, providing a high connection strength. A relatively large rotating torque can be realized by the relatively small size, for example, the torque can reach over 3.5 kg/cm with the overall outer diameter within 3.3 mm.

DETAILED DESCRIPTION OF THE EMBODIMENTS

Figure 1:
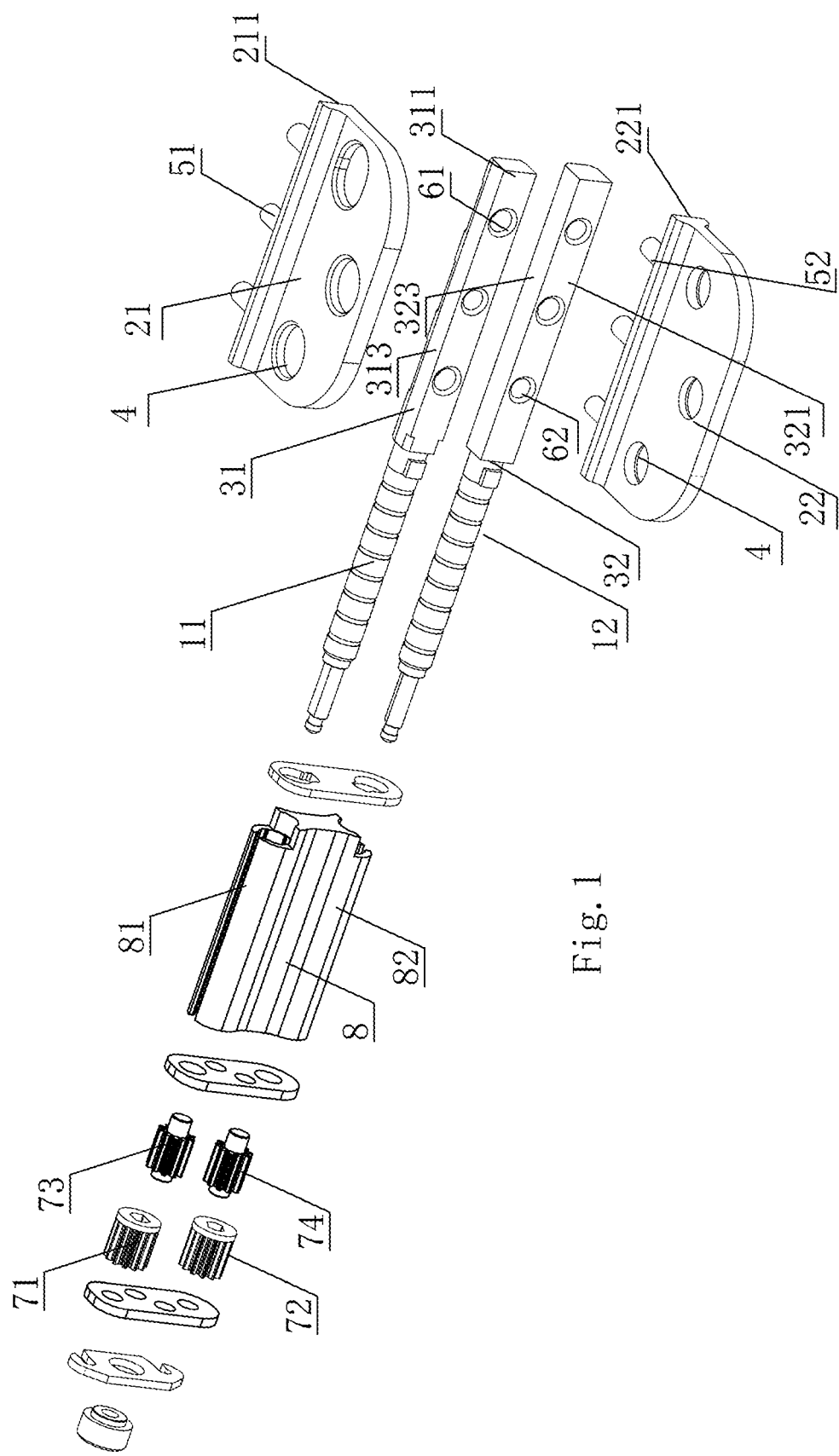
FIG. 1 is an exploded view of a biaxial hinge mechanism according to an embodiment of the invention.
Figure 3:
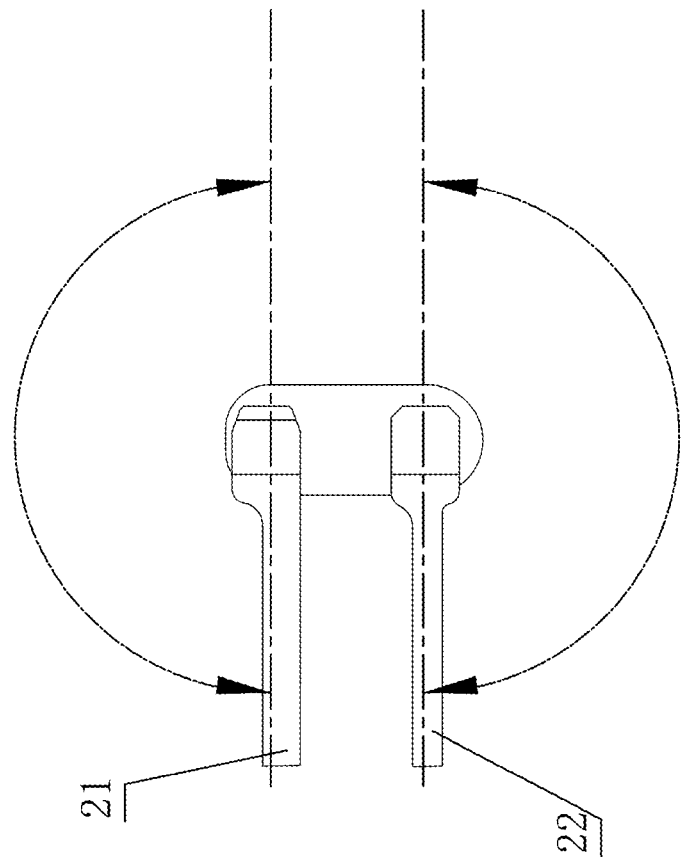
FIG. 3 is a schematic view showing the rotation, opening and closing of a biaxial hinge mechanism of the invention.
Figure 2:
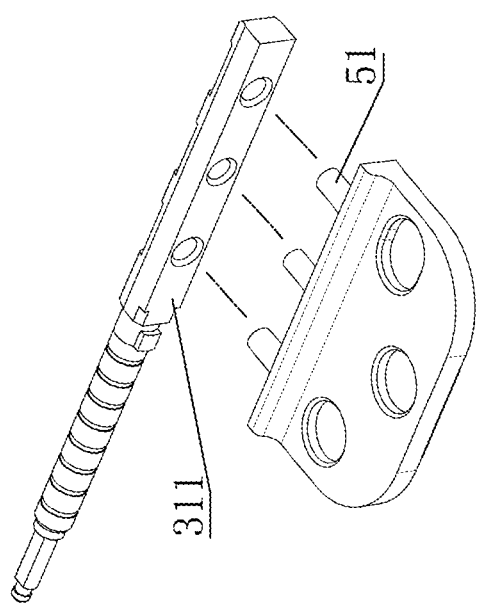
FIG. 2 is a schematic view showing the installation of a support of the invention.
Figure 4:
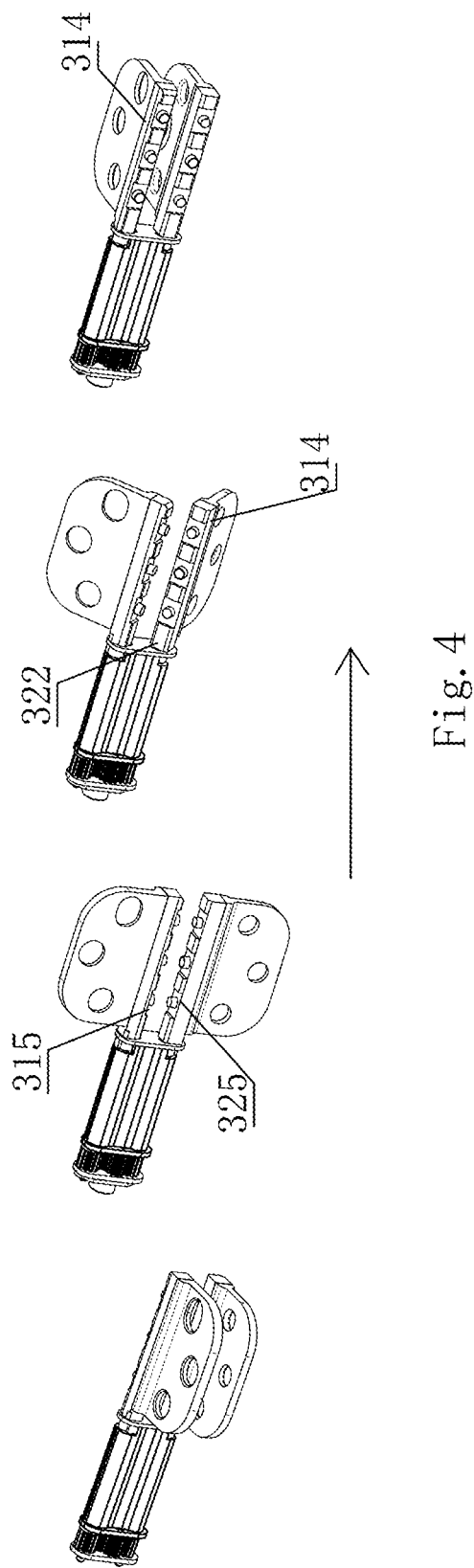
FIG. 4 is a demonstration view showing the opening process of a biaxial hinge mechanism of the invention.
Figure 5:
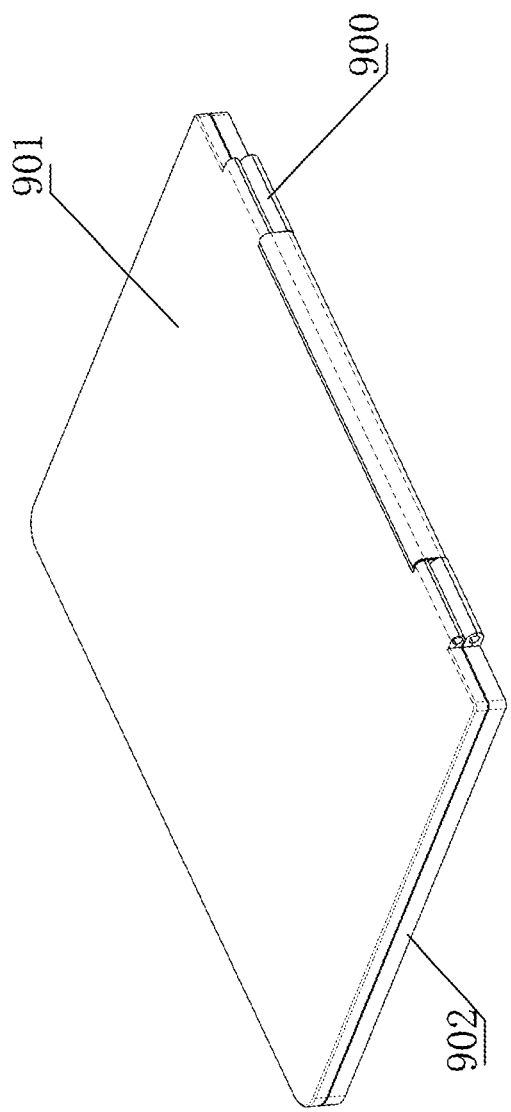
FIG. 5 is a schematic view of a mobile terminal to which a biaxial hinge mechanism of the invention is applied.

Referring to the figures, a biaxial hinge mechanism used on a mobile terminal provided herein, comprising a first shaft 11 and a second shaft 12 parallel to each other, and a first support 21 and a second support 22, wherein the first support 21 and second support 22 are respectively connected to the connection ends 31, 32 of the first shaft 11 and second shaft 12, the first support 21 and second support 22 are provided with portions for connecting with two relatively rotating components on the mobile terminal, and the portion may be a connection hole 4.

The first support 21 is provided with a connection end face 211 facing side face 311 of connection end of the first shaft, a first riveting column 51 formed in an integrated manner with the first support 21 by powder metallurgy die casting technology is provided on the connection end face 211 of the first support, the first shaft connection end 31 is provided with a first connection through hole 61 on the side face of the first shaft connection end 311; the first riveting column 51 is connected to the first connection through hole 61; the second support 22 is provided with a connection end face 221 facing side face 321 of connection end of the second shaft, a second riveting column 52 formed in an integrated manner with the second support 22 by powder metallurgy die casting technology is provided on the connection end face 221 of the second support, the second shaft connection end 32 is provided with a second connection through hole 62 on the side face of the second shaft connection end 321, the second riveting column 52 is connected to the second connection through hole 62; the side faces 311, 321 are the faces the connection end faces 31, 32 of the first shaft and second shaft face to when the biaxial hinge mechanism is in a closed state.

In order to further reduce the thickness and maintain sufficient strength, the connection ends are provided with grooves 315, 325 around an opening of the other end of the connection through hole on another side face 312, 322 with respect to the side surface, and the grooves are provided with flat bottom surfaces.

In order to further reduce the thickness, the side faces 311, 321 are planes, the connection end faces 211, 221 are planes; the top surfaces 313, 323 and the bottom surfaces 314, 324 of the connection ends 31, 32 are planes when the biaxial hinge mechanism is in a closed state.

A synchronization mechanism is connected between the first shaft 11 and the second shaft 12, to enable them to achieve simultaneous reverse rotation.

The synchronization mechanism can adopt a variety of structures such as a cam, a gear, and a spiral, etc. The synchronization mechanism of the present embodiment comprises a first gear 71 and a second gear 72 respectively connected to the first shaft 11 and the second shaft 12, rotation centers of the first gear 71 and the second gear 72 respectively coincide with rotation centers of the first shaft 11 and the second shaft 12, the first gear 71 and the second gear 72 are respectively sleeved outside the first shaft 11 and the second shaft 12, the first gear 71 is connected to the second gear 72 by a transition gear pair composed of a third gear 73 and a fourth gear 74, the number of teeth and diameter of the first gear 71 are the same as the second gear 72, and the number of teeth and diameter of the third gear 73 are the same as the fourth gear 74.

The biaxial hinge mechanism is further provided with a torsion member 8, and a first reed pipe 81 and a second reed pipe 82 are respectively provided on the upper and lower portions of the torsion member, the first reed pipe 81 and the second reed pipe 82 are respectively sleeved on the first shaft 11 and the second shaft 12, and frictionally engaged with the first shaft 11 and the second shaft 12 respectively, to achieve instant positioning when stopped at any time as necessary during the rotation of the hinge.

In the present embodiment, taking a notebook computer as an example, a mobile terminal comprises a body 902 and a cover 901, the body 902 is connected to the cover 901 by the foregoing biaxial hinge mechanism 900, the first support is connected to the cover 101, and the second support 22 is connected to the body 102.

The foregoing description only describes a specific embodiment of the present invention, but the structural features of the invention are not limited thereto, any changes or modifications made by those skilled in the art based on the invention shall fall into the scope of protection of the present invention.

The invention claimed is:

1. A biaxial hinge mechanism used on a mobile terminal, comprising:
a first shaft and a second shaft parallel to each other; and
a first support and a second support,
wherein the first and second supports are respectively connected to connection ends of the first and second shafts, the first and second supports are provided with portions for connecting with two relatively rotating components on the mobile terminal;
wherein the first support is provided with a connection end face facing a side face of the connection end of the first shaft, a first riveting column formed in an integrated manner with the first support is provided on the connection end face of the first support, the connection end of the first shaft is provided with a first connection through hole on the side face of the connection end of the first shaft; the first riveting column is connected to the first connection through hole;
the second support is provided with a connection end face facing a side face of the connection end of the second shaft, a second riveting column formed in an integrated manner with the second support is provided on the connection end face of the second support, the connection end of the second shaft is provided with a second connection through hole on the side face of the connection end of the second shaft, the second riveting column is connected to the second connection through hole; and
the side faces of the connection ends of the first and second shafts are the faces that the connection end faces of the first and second supports face to, respectively, when the biaxial hinge mechanism is in a closed state.

2. The biaxial hinge mechanism used on a mobile terminal according to claim 1, wherein the connection end is provided with a groove around an opening of an other end of the connection through hole on another side face with respect to the side surface, and the groove is provided with a flat bottom surface.

3. The biaxial hinge mechanism used on a mobile terminal according to claim 1, wherein the side face is a plane, and the connection end face is a plane.

4. The biaxial hinge mechanism used on a mobile terminal according to claim 3, wherein a top surface and a bottom surface of the connection end are planes when the biaxial hinge mechanism is in a closed state.

5. The biaxial hinge mechanism used on a mobile terminal according to claim 1, wherein the side face is a plane, the connection end face is a plane; a top surface and a bottom surface of the connection end are planes or concave surfaces when the biaxial hinge mechanism is in a closed state.

6. The biaxial hinge mechanism used on a mobile terminal according to claim 1, wherein a synchronization mechanism is connected between the first shaft and the second shaft.

7. The biaxial hinge mechanism used on a mobile terminal according to claim 6, wherein the synchronization mechanism comprises a first gear and a second gear respectively connected to the first shaft and the second shaft, rotation centers of the first gear and the second gear respectively coincide with rotation centers of the first shaft and the second shaft, the first gear is connected to the second gear by a transition gear pair composed of a third gear and a fourth gear, a number of teeth and diameter of the first gear are the same as the second gear, and a number of teeth and diameter of the third gear are the same as the fourth gear.

8. The biaxial hinge mechanism used on a mobile terminal according to claim 7, wherein the first gear and the second gear are respectively sleeved outside the first shaft and the second shaft.

9. The biaxial hinge mechanism used on a mobile terminal according to claim 1, wherein the biaxial hinge mechanism is further provided with a torsion member, and a first reed pipe and a second reed pipe are respectively provided on upper and lower portions of the torsion member, the first reed pipe and the second reed pipe are respectively sleeved on the first shaft and the second shaft, and frictionally engaged with the first shaft and the second shaft respectively.

10. A mobile terminal comprising the biaxial hinge mechanism of claim 1, the mobile terminal comprising a body and a cover, wherein the first support and the second support are respectively connected to the body and the cover of the mobile terminal.

\* \* \* \* \*